T. H. BIRCH.
Charging-Scoop for Gas-Retorts.
No. 200,888. Patented March 5, 1878.
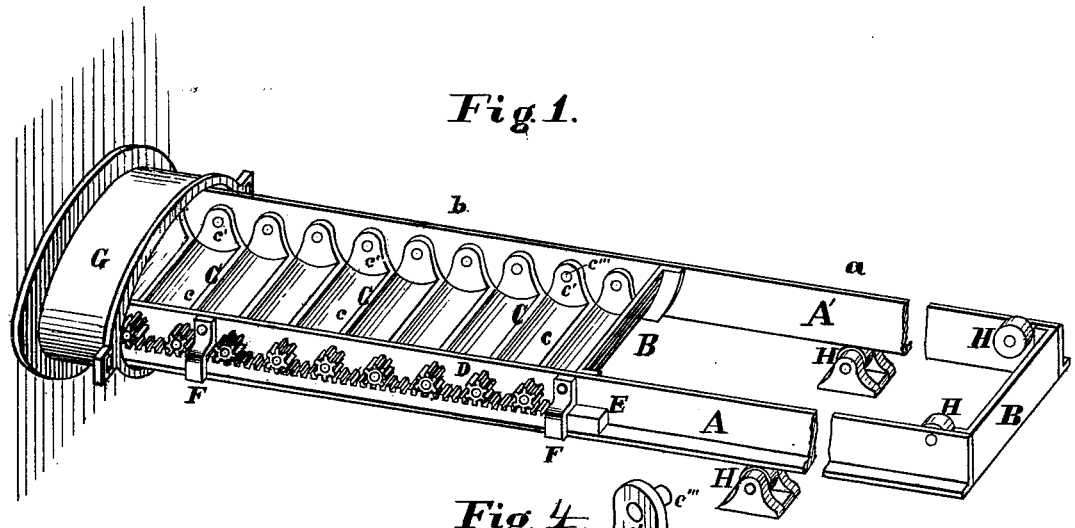
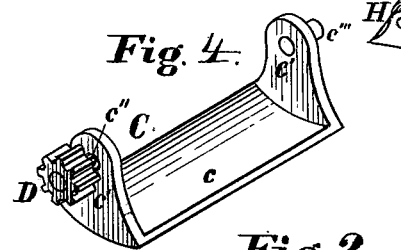
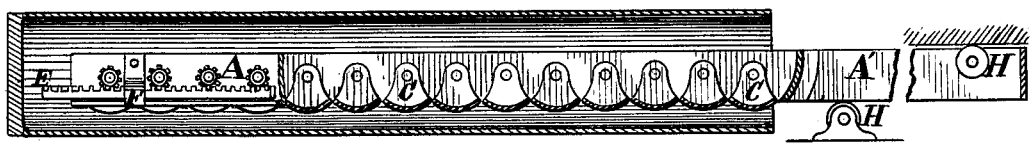
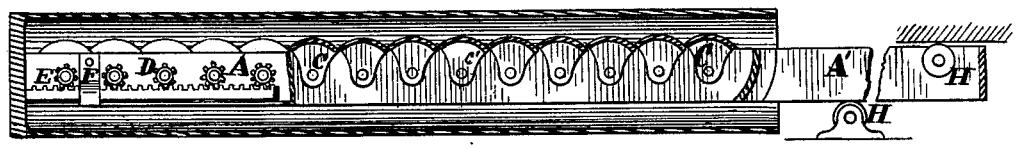

UNITED STATES PATENT OFFICE.

THOMAS H. BIRCH, OF CINCINNATI, OHIO.

IMPROVEMENT IN CHARGING-SCOOPS FOR GAS-RETORTS.

Specification forming part of Letters Patent No. 200,888, dated March 5, 1878; application filed December 18, 1877.

*To all whom it may concern:*

Be it known that I, THOMAS H. BIRCH, of Cincinnati, Hamilton county, Ohio, have invented a new and useful Improvement in Charging-Scoop for Gas-Retorts, of which the following is a specification:

My invention relates to a device for conducting a charge of coal into a retort and depositing it evenly throughout the entire length and breadth of the retort; and my device consists, essentially, of a congeries of buckets, pivoted transversely between a pair of parallel bars, which constitute the scoop-frame, the said congeries occupying a space in said frame nearly equal to the length of the retort, each bucket having a pinion, and the entire series of pinions meshing in a rack, which, in its normal position, may extend in front of the scoop-frame, so as to be driven back by its impact with the rear wall of the retort, and so as to subject the pinions and their attached and depending buckets to a semi-rotation, and thereby to discharge their contents onto the floor of the retort which, having been done, the scoop is withdrawn from the retort and the rack retracted, so as to allow the buckets to drop back to their normal position.

In the accompanying drawings, Figure 1 is a perspective view of a scoop embodying my invention, said scoop being shown partly inserted in the retort, and a portion of the scoop-shank broken away. Fig. 2 is a partially-sectional elevation of my scoop within the retort, which latter is shown in section, and whose rear end the protruding bucket-rack is about to strike, so as to invert the buckets. Fig. 3 is a view similar to the last, except that the scoop is shown driven to the extremity of the retort, and the buckets consequently inverted. Fig. 4 shows one of the buckets detached.

A A' represent two similar iron plates, which, with cross-bars B, constitute the frame of my scoop. This frame is about twice the length of the retort, one half of its length, $a$, constituting the shank or handle, and the other half, $b$, affording journal-bearing for a series of buckets, C. Each bucket has a concave pan or bottom, $c$, and a pair of upturned wings, $c'$, having pivots $c''$ $c'''$, by which the bucket is both journaled and suspended within the frame. Of these pivots, one pivot, $c''$, protrudes through the frame, and carries a pinion, D, which meshes within a rack, E, restricted to a longitudinal motion upon the frame by means of clips F.

G represents a portion of a retort. H represents rollers, which serve to maintain the scoop in proper alignment with the retort, so as to enable said scoop to enter, occupy, and withdraw from the retort without touching any part thereof.

The operation of my scoop is as follows: The scoop being in its retracted position outside of the retort, and the buckets in their normal position, as indicated in Figs. 1 and 2, the proper charge of coal is deposited by the instrumentality of the customary coal-meter, or other suitable means, so as to occupy the pans $c'$, and, the retort being opened, the scoop is thrust into it. This action operates to invert the buckets, so as to cause them to assume the position shown in Fig. 3, said inversion being brought about in the present illustration by the impact of the extremity of the rack E against the rear end of the retort. The inversion of the buckets operates to dump or deposit the scoopful of coal in a remarkably even and uniform manner throughout the length and breadth of the retort. The scoop is then promptly withdrawn from the retort, and the rack reversed, so as to restore the buckets to their normal position, ready for another charge.

I make my buckets, preferably, of steel, and the other parts of the scoop of wrought-iron.

The scoop and its attached rack-movement may be worked either by hand or by means of suitable machinery, and the rack may be operated wholly by appliances outside of the retort.

A system of pinions and corresponding rack-bar, similar to that shown on the left side of the scoop-frame, may be applied likewise on its right side, so as to overcome the strain and torsion incident to a single rack.

I am aware that in charging gas-retorts scoops have heretofore been employed to convey coal into the same; and that said scoops have sometimes been made in segments or sections, hung at the ends upon separate center studs, so that the coal contained in said scoops may be deposited upon the floor of the retort when the segments are reversed. By my arrangement, however, I am enabled to secure a more even distribution of the coal than heretofore, owing to the fact that my charger is composed of a number of buckets, arranged to tilt crosswise of the retort along its whole length, thus entirely preventing any heaps being formed at either the center or other parts of the retort floor, which difficulty is often experienced with retort-chargers now in use.

I claim as new and of my invention—

1. A series of invertible buckets, C, suspended transversely within a suitable scoop-frame, and operating substantially as set forth.

2. The series of buckets C, pivoted transversely within the open scoop-frame A A', and having geared or other suitable connection D, with one or more slide-bars or racks, E, substantially as and for the purpose set forth.

In testimony of which invention I hereunto set my hand.

THOMAS H. BIRCH.

Attest:
GEORGE H. KOLKER,
GEO. H. KNIGHT.